June 3, 1958 L. J. ANDRES 2,837,338

CONTINUOUS MULTIPLE RECORD PLAYER

Filed March 23, 1954 5 Sheets-Sheet 1

Inventor

Lloyd J Andres

June 3, 1958 L. J. ANDRES 2,837,338

CONTINUOUS MULTIPLE RECORD PLAYER

Filed March 23, 1954 5 Sheets-Sheet 2

Inventor

Lloyd J. Andres

June 3, 1958 L. J. ANDRES 2,837,338

CONTINUOUS MULTIPLE RECORD PLAYER

Filed March 23, 1954 5 Sheets-Sheet 3

Inventor
Lloyd J. Andres

June 3, 1958 L. J. ANDRES 2,837,338

CONTINUOUS MULTIPLE RECORD PLAYER

Filed March 23, 1954 5 Sheets-Sheet 4

Inventor

Lloyd J. Andres

June 3, 1958 L. J. ANDRES 2,837,338

CONTINUOUS MULTIPLE RECORD PLAYER

Filed March 23, 1954 5 Sheets-Sheet 5

Inventor

Lloyd J. Andres

United States Patent Office 2,837,338

Patented June 3, 1958

2,837,338

CONTINUOUS MULTIPLE RECORD PLAYER

Lloyd J. Andres, Itasca, Ill.

Application March 23, 1954, Serial No. 417,988

7 Claims. (Cl. 274—10)

This invention relates to phonographs and more particularly to an automatic record player for sequentially playing both sides of a plurality of disc records.

Record players for playing both sides of records prior to this invention usually employed reversible turntable drives and/or special dual needle tone arms and/or other complicated mechanism for inverting each record individually for playing both sides thereof.

This invention overcomes the above complications and objections by incorporating the basic principle of the hourglass, thus retaining a uni-directional turntable drive and a conventional single needle tone arm and a relatively simple combination of transmission and control elements.

This record player may be considered as two distinct related mechanisms; the first comprising a record changing and playing device, which is the subject matter of this application, and second, a transmission for automatically driving and controlling the record changing and playing device which is the subject matter of a subsequent application.

A principal object of the invention is the provision of a turntable means whereby a predetermined stack of disc records therein may be sequentially and continuously played on both sides thereof.

Another object of this invention is the provision of a single post dual turntable means which will sequentially position for playing one side of each of a plurality of records when in one position and following the playing of the last of said records in said position and the inversion of said dual turntable means will sequentially present each of the same plurality of records for playing on their opposite sides.

A further object of the invention is the provision of a turntable means suspended by a rotatable cradle whereby each of a predetermined plurality of disc records will be sequentially released for playing on one side and by the inversion of said cradle each of said records will be sequentially released for playing on their opposite sides.

A further object of the invention is the provision of an invertible turntable spindle having a record release mechanism therein which will sequentially release records when in one position and sequentially release records when it is in its inverted position.

Another object of the invention is the provision of a cradle for inverting a dual turntable including means for indexing and latching said cradle in each of two predetermined vertical positions.

Another object of the invention is the provision of a cradle for inverting a dual turntable means including feeler means responsive to the position of records in said turntable means for initiating the inversion of said cradle following the playing of the last of said records on one side.

A further object of the invention is the provision of a pair of turntables having a common coaxial center post with one of said turntables yieldably secured for removal for the insertion and removal of a plurality of records.

These and other objects and advantages in one embodiment of the invention are described and shown in the attached specification and drawings in which.

Figure 1:
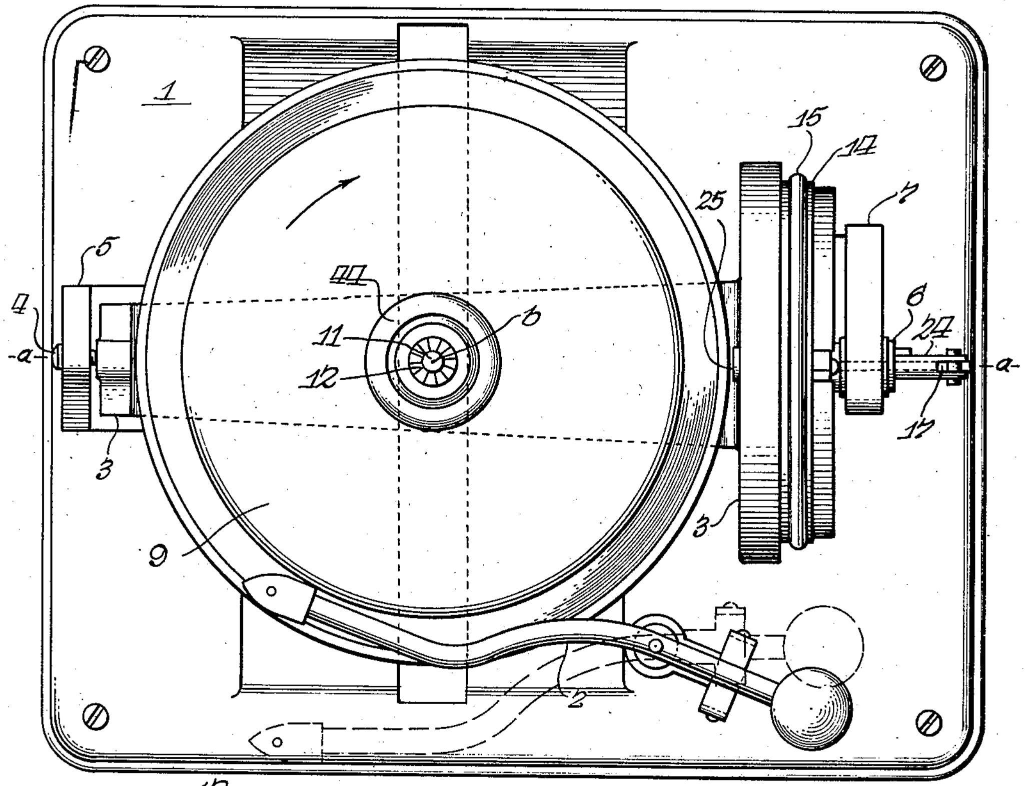
Fig. 1 is a plan view of the record player.
Figures 2, 3, 4:
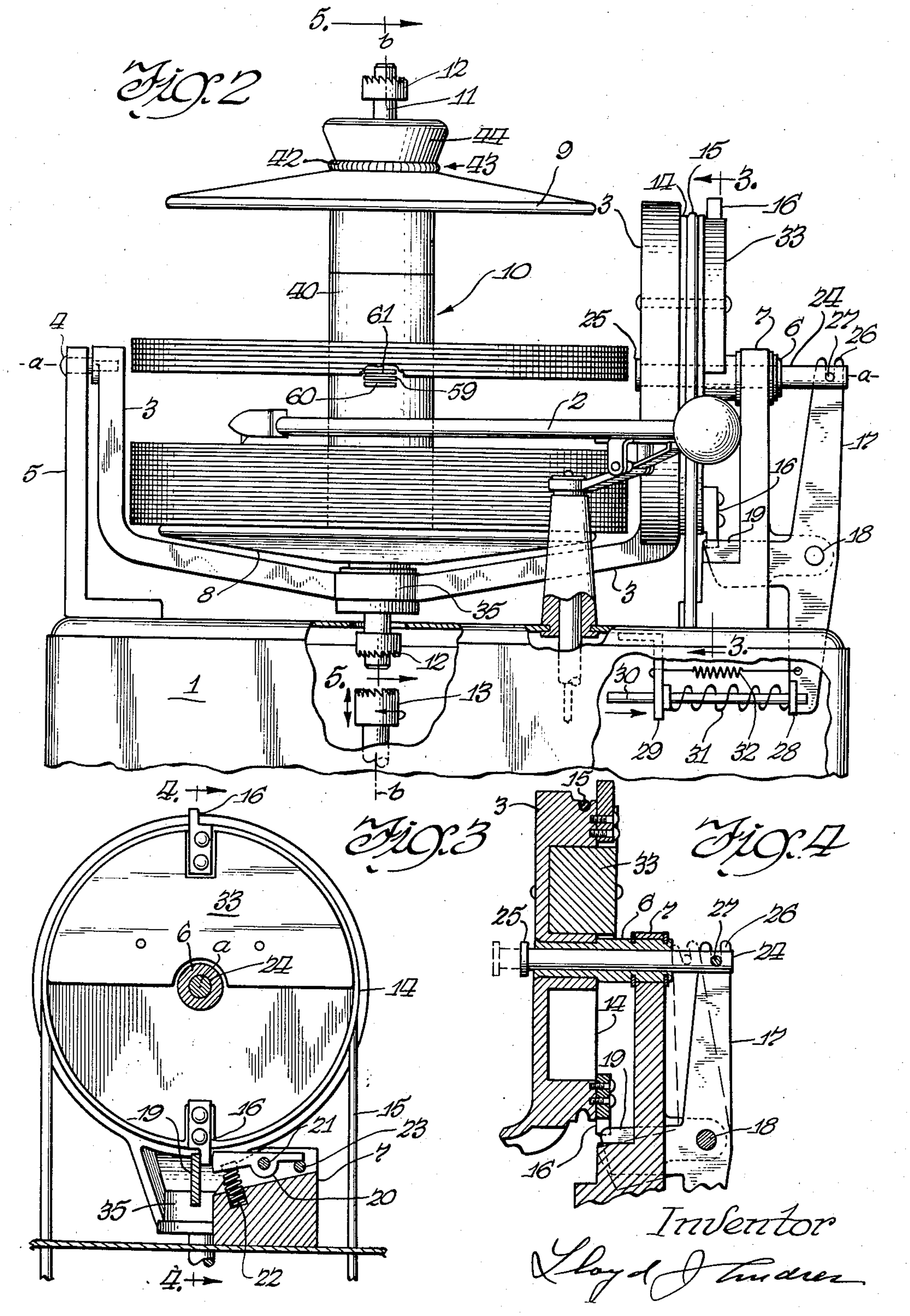
Fig. 2 is a fragmentary side elevation of the record player shown in Fig. 1.
Fig. 3 is a cross sectional end view of the record player taken through section line 3—3 of Fig. 2.
Fig. 4 is a fragmentary cross sectional view taken through section line 4—4 Fig. 3.

Referring to Figs. 1 and 2 a housing or base 1 supports the record playing elements and serves as an enclosure for an automatic motor driven transmission for operating the record changing elements. The transmission is not shown or described.

A conventional pivotally mounted tone arm assembly 2 is shown in full lines in playing position and shown in rest position in dotted lines in Fig. 1.

A yoke or cradle member 3 is journaled for rotation about axis *a—a* shown Figs. 2 and 3. One side of cradle 3 is journaled on pivot screw 4 in support 5 secured on the base 1. The opposite side of the cradle is supported by a hollow shaft 6 journaled in support 7 which is also secured to the base 1.

Turntable 8 and turntable 9 are equi-spaced from axis *a—a* and coaxial with a center post assembly 10 and are journaled for rotation on a hollow shaft, secured in cradle 3, for rotation about axis *b—b* which axis *b—b* is at right angles to and intersects axis *a—a*. A drive spindle 11 having an identical clutch member 12 secured on each opposite end is slidably keyed for reciprocating movement in the turntable post assembly 10. A clutch drive member 13 responsive to a transmission, not shown, is adapted for intermittent rotary and reciprocating movement and provides the means by which the turntable center post assembly is rotated and by which records are sequentially tripped for playing.

Referring to Figs. 1, 2, 3 and 4, a pulley 14 integral with cradle 3 provides the means for rotating the cradle about axis *a—a* to invert the turntables and center post from their position shown in Figs. 1 and 2. This inversion is accomplished by applying linear movement to an endless belt 15 which is intermittently driven by the transmission, not shown.

A pair of stop abutments or dogs 16 are secured in opposite relation on the pulley 14, as shown, and a control lever 17, best shown Fig. 2, is pivoted for movement on support 7 by pin 18. The inner portion of the lever 17 is supported against lateral movement by the walls of a slot in support 7 with the stop portion 19 normally positioned in the path of movement of the dogs 16 as shown in Figs. 2 and 3.

A counterweight 33 secured in the outer face of the pulley is provided to counterbalance the weight of the cradle to facilitate uniform rotation thereof.

Referring to Fig. 3, a latch 20 is pivotly secured in a slot in support 7 by a pin 21. A compression spring 22 is retained in a cavity in support 7 and normally urges one end of the lever 20 against a stop pin 23. The opposite working end of the latch is shaped to retain the dogs 16 against the stop portion 19 of the lever 17.

Referring to Figs. 1 and 4, feeler rod 24 having a contact head 25 is slidably secured in the bore of shaft 6. The outer end of the rod 24 is slotted to receive a clevis 26 on the upper end of lever 17 and coupled thereto by pin 27. The lower end of lever 17 terminates in an offset 28. A fixed bracket 29 supports release rod 30 at one end. The opposite end of rod 30 is slidably positioned in a hole in the offset 28. A compression spring 31 is positioned against a flange on shaft 30 and against the offset 28 and normally is not compressed. A relatively light tension spring 32 is secured at its opposite ends to bracket 29 and lever 17 to normally urge the push rod 30 and the lever 17 and the feeler rod 24 in the position shown in Fig. 2 and shown full lines in Fig. 4.

When all records retained on the post 10 are tripped to their lowermost position resting on the lowermost turntable, and the release rod 30 is momentarily moved in the direction shown by arrow, the relatively stiff compression spring 31 will move lever 17 and unlatch dog 16 as shown in dotted lines Fig. 4. Under these conditions, movements supplied by belt 15 will permit 180 degrees rotation of the cradle. When the opposite dog 16 engages and trips latch 20, the stop 19 will arrest further motion of the cradle with the latch 20 and stop 19 retaining the cradle in its locked inverted position for playing the records on their opposite sides.

It is now apparent that so long as a record remains in the mid-portion of the center post, the cradle will remain in a locked position since each cyclic horizontal movement applied to release rod 30 will compress spring 31 because of the interference of a record with the movement of the contact head 25 of rod 24.

It is to be noted that the cradle may be rotated by the transmission, not shown, by one of several drive means alternate to the belt drive, such as gear trains, friction drive wheels, or articulated link works.

Figures 5, 6, 7:
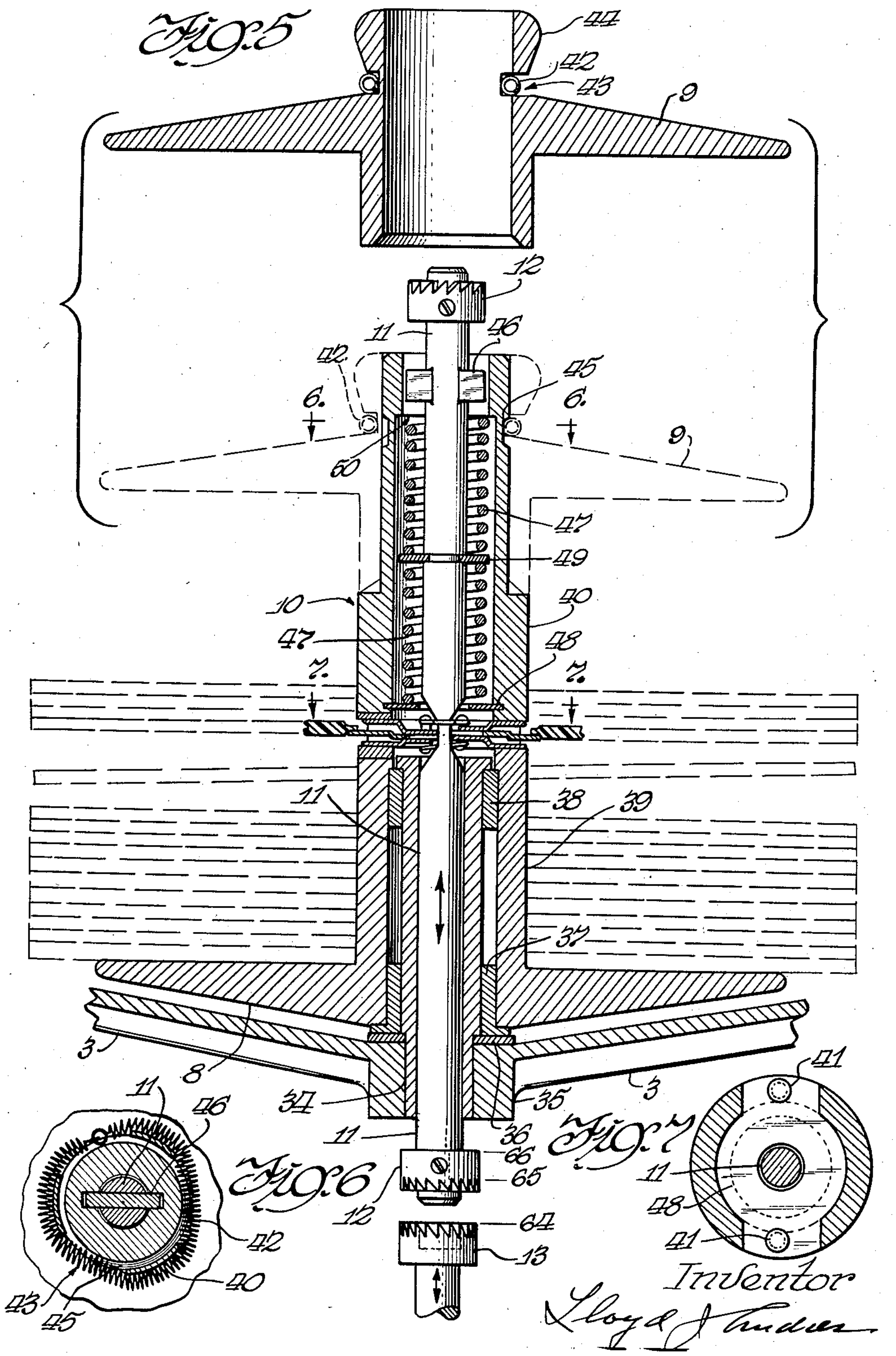
Fig. 5 is an enlarged fragmentary cross sectional view taken through section line 5—5 of Fig. 2.
Fig. 6 is a fragmentary cross sectional view taken through section line 6—6 of Fig. 5.
Fig. 7 is a cross sectional view taken through section 7—7 Fig. 5.

The turntable assembly, shown Fig. 5, is secured for rotation by bearings 36, 37 and 38 on a hollow shaft 34 secured at one end in boss 35 of cradle 3.

The post assembly 10 is comprised of a lower post 39 integral with turntable 8 and an upper post 40 joined in coaxial relationship by screws 41 shown in Fig. 7. These screws are positioned in opposite cavities, not shown, in the upper post 40 and are threaded into mating holes in the lower post 39.

The upper turntable 9 is detachable as shown in full lines Fig. 5 and is latched into position as shown in dotted lines on the post assembly 40 by endless coil spring 42 which is freely fitted in an annular groove 43 in the periphery of the finger hub 44 of the turntable.

Referring to Fig. 6 the groove 43 is cut through the inner wall of the post 40 at three places thus permitting the spring to engage the angular and annular cam surface 45 encircling the upper post 40 at three places corresponding with the three openings in the groove 43. The spring thus exerts a detent action of sufficient force to hold the upper turntable in operative relation with the post 40 and permits the convenient manual removal thereof when sufficient pull on the finger hub 44 is exerted to overcome the detent action of spring 42, thus enabling the replacement of records retained on post assembly 10.

It is apparent that the upper turntable 9 may be detachably secured to the upper post 40 by screw threads, bayonet means or one or more spring urged latches as alternates to the spring detent means shown.

A spindle 11 is provided for rotating the turntable assembly and for sequentially tripping records retained on the post assembly 10 and is normally positioned in a mid-position through a bore through turntable 9, post assembly 10 and the bore in shaft 34 and is slidably keyed in the upper post 40 by key 46 as shown in Figs. 5 and 6. A pair of identical compression springs 47 is positioned between retainer plate 48, better shown in Fig. 7, and a shoulder 50 in the upper part of post 40. The inner end of each spring bears against opposite sides of a collar washer 49 secured to spindle 11 as shown in Fig. 5.

Identical clutch members 12—12 are secured at opposite ends of the spindle 11 which members are intended to alternately be engaged by a drive member 13 for imparting reciprocating and rotary movement to the spindle.

The record rest and release mechanism in the mid-portion of the post assembly 10 is better shown in enlarged views, Figs. 8, 9, 10 and 11.

Figure 8:
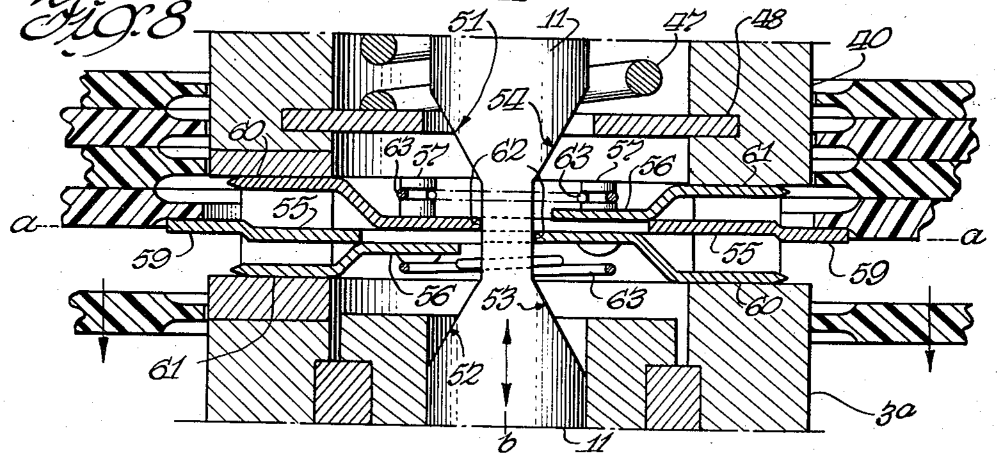
Fig. 8 is a fragmentary enlarged view of a portion of Fig. 5.

Referring to enlarged view Fig. 8, the mid-portion of spindle 11 is provided with two pairs of inclined cam surfaces 51, 52, 53 and 54 symmetrically positioned with respect to axis *a—a* and axis *b—b*. The spindle 11 is shown in Fig. 8 in its normal inoperative position with the record release plates positioned against a neutral parallel portion of spindle 11 midway between the cam surfaces.

Figure 9:
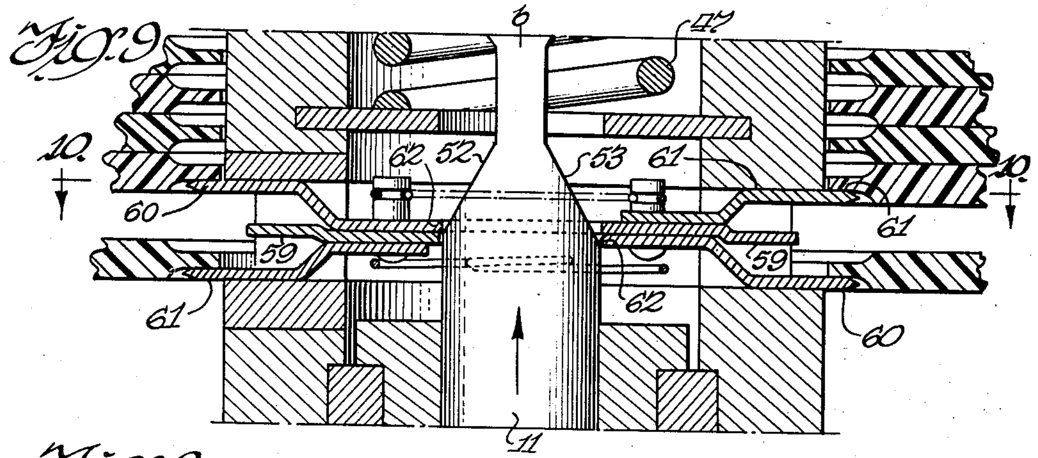
Fig. 9 is the same as Fig. 8 in changed position.
Figure 10:
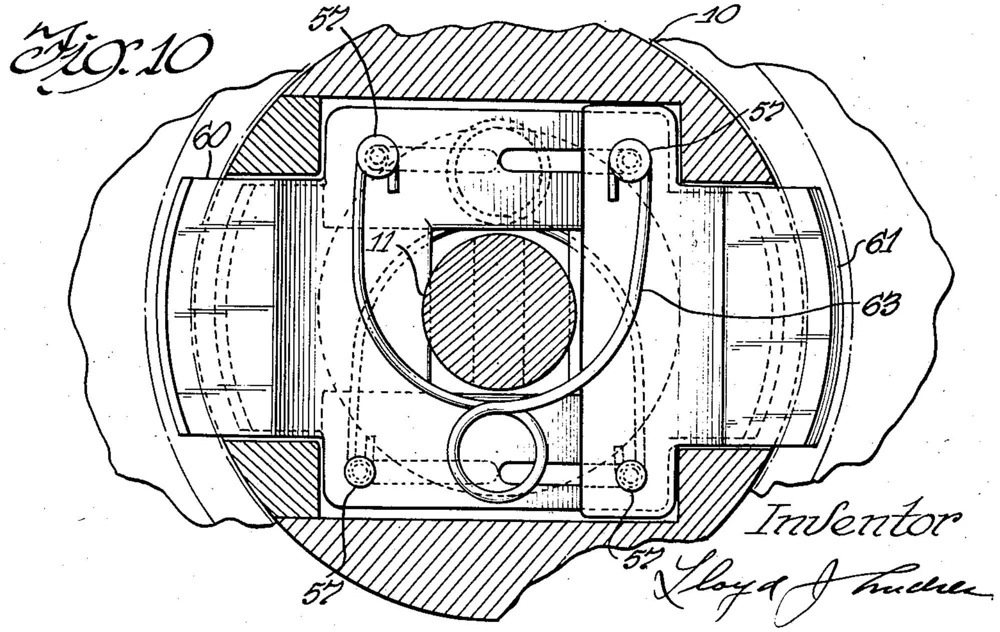
Fig. 10 is a fragmentary cross sectional plan view taken through section line 10—10 Fig. 9.
Figure 11:
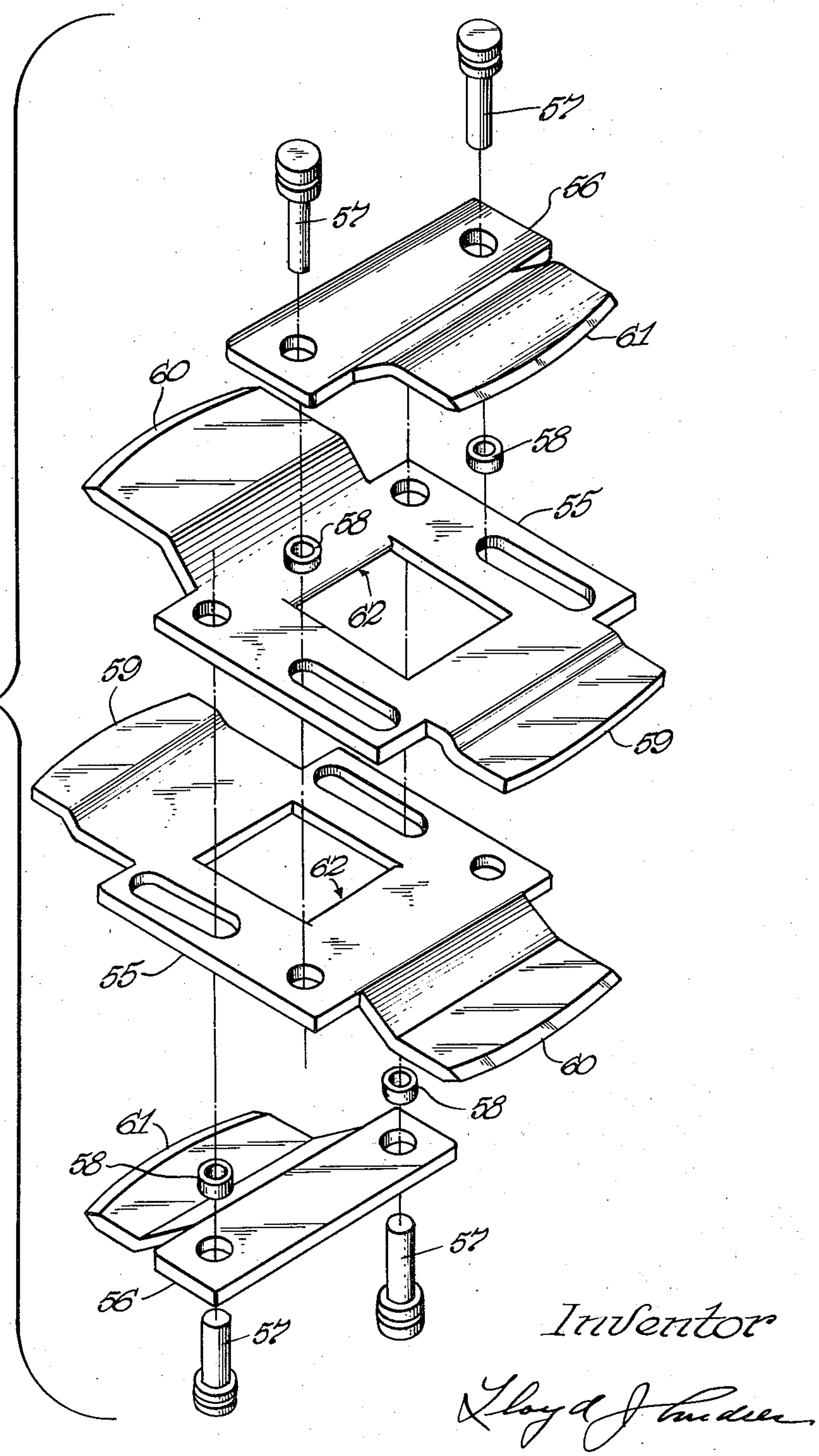
Fig. 11 is an enlarged exploded view of elements shown in Figs. 8, 9 and 10.

Referring to exploded view Fig. 11 a pair of main plates 55—55 and a pair of auxiliary plates 56—56 are adapted to be assembled together by four rivet studs 57 and four bushings 58. A rest blade 59 is formed on one end of each plate 55. A knife edged release blade 60 is formed on each opposite end of the plates 55. An auxiliary release blade 61 is formed on one end of each auxiliary plate 56. Each main plate is provided with a radiused cam surface 62 as shown on one side of a central aperature in each plate. When the plates are assembled by the four riveted studs in interleaved sandwich fashion with a bushing 58 around each stud and positioned in each elongated slot in the main plates then the record tripping mechanism appears as shown in Figs. 8, 9 and 10. The main plates 55 are slidable in opposite direction and each main plate moves therewith one auxiliary plate 61 through the anchorage of studs 57. The plate assembly is slidably retained in a suitable rectangular opening in the post assembly 10.

It is now apparent that when the rest blades 59 are projected as shown in Fig. 8, the release blades 60—60 and 61—61 will be in their retracted positions. The plates are urged into their normal position with their cam surfaces 62 resting against the neutral portion of spindle 11 shown in Fig. 8 by two hairpin springs 63 positioned above and below the plates respectively with their ends engaged with the studs 57 as shown.

It is apparent that when the spindle 11 is moved a predetermined distance in either direction, either of the pairs of cam surfaces 52—53 or the cam surfaces 51—54 will engage the plate cam surfaces 62—62, and retract rest blade 59—59 and simultaneously project the corresponding release blades 60—61 to their outer positions as shown in Fig. 9.

Referring to Fig. 8, a plurality of disc records are illustrated resting in stacked relation on rest blades 59 and under the assumption that spindle 11 is moved upward as shown in Fig. 9, the lowermost of the stack of records will gravitate from the retracted rest blades 59 and temporarily rest upon the lower release blades 60—61. The remaining records in the stack will likewise temporarily rest upon the projected upper release blades 60—61.

Then upon the return movement of spindle 11 to normal mid-position shown in Fig. 8, the lowermost record will descend to the lowermost turntable as indicated by arrows and shown in dotted lines in Fig. 5, and the remaining stack of records will descend to rest upon the now projected rest blades 59, as shown in Fig. 8. It is now apparent that a stack of records may be sequentially released to a lowermost turntable by the reciprocation of the spindle 11 in either direction from its mid-position.

Under the assumption that a motor driven transmission is adapted to drive the clutch member 13, tone arm 2, release rod 30 and belt 15 of the record player and that the elements are in positions shown in Figs. 1, 2 and 5, then the mechanism will function as follows. The rotating clutch member 13 will engage the lowermost clutch member 12 at position 64 shown in Fig. 5 and continue its upward motion to position 66 and immediately return to position 65. This movement will trip a record from the release means to the lower turntable and rotate the turntable assembly. The tone arm 2 will respond to the transmission and move inwardly and engage and play the record as shown full lines Figs. 1 and 2.

Upon completion of play, the tone arm will initiate the transmission and return to its normal rest position shown in dotted lines Fig. 1. The clutch member 13 will descend from position 65 to position 64 and stop the rotation of the turntable assembly. Following the play of each record, feeler rod 24 will move toward the post 10 and will be prevented from unlatching dog 16 so long as a record remains suspended on the release means in the mid-portion of post 10.

Figure 12:
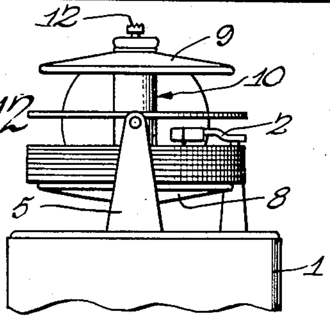
Fig. 12 is a diagrammatic illustration of the record player positioned to release and play the next to the uppermost record in the stack when the dual turntable is in one vertical position.
Figure 13:
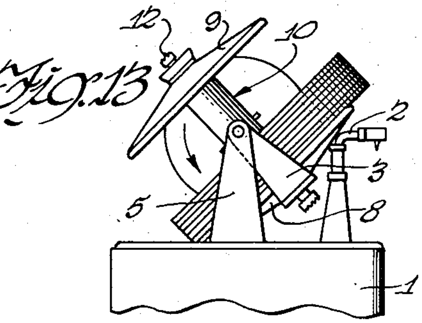
Fig. 13 is a diagrammatic illustration of the record player showing in one position the dual turntables during inversion of same.
Figure 14:
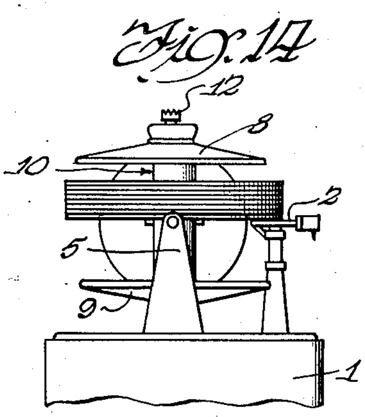
Fig. 14 is a diagrammatic illustration of the record player following the inversion of the turntables and positioned to begin the release and play of the opposite sides of the records shown in Fig. 12.

Figs. 12, 13 and 14 illustrate the inversion of the turntable assembly by cradle 3 and the inversion of the records retained on the post assembly 10 for sequentially and continuously playing both sides of each record in the stack.

The continuous cycling of the transmission will play a predetermined stack of records on one side. When the last record of the stack has been played on turntable 8, the feeler rod 24 will be unimpeded and its inward movement will permit the unlocking of the lower dog 16 and, simultaneously and after withdrawal of the clutch member 13, the belt 15 will rotate cradle 3 one-half revolution and latch the opposite dog 16, thus inverting the turntable assembly and positioning the inverted stack of records above the record release means. The continued operation of the player as previously described will sequentially present each record in the stack to the now lowermost turntable 9 for sequential playing. It is now apparent that a predetermined stack of records may be continuously and sequentially played on both sides without manual attention.

Having described my invention, I claim:

1. In a record player of the character described means forming a base, cradle means on said base journaled for rotation about a horizontal axis, locking means on said base for securing said cradle means in each of two opposite positions, a dual turntable means journaled for rotation in said cradle about an axis normal to and intersecting said horizontal axis, said turntable means comprising a pair of turntables equi-spaced from said horizontal axis and fixed to a coaxial center post, said post adapted to slidably retain concentric therewith a plurality of disc records in stacked relation, record holding and tripping means positioned in the mid-portion of said spindle for holding and sequentially releasing each of said records from a position above said mid-portion to a position on the lower of either said turntables for playing one side thereof when operated, whereby the release of said locking means and the rotation of said cradle means to its said opposite position and the relocking of said locking means will deposit all of said records by gravity from one of said turntables to rest upon said release means for sequential deposit to the other of said turntable for the sequential playing of their opposite sides.

2. An invertible dual turntable assembly for playing both sides of a plurality of records adapted for concentric rotation about a vertical axis in either of two positions comprising a first and second turntable secured in parallel spaced coaxial relation with a center post for slidably retaining a plurality of like disc records on said post between said turntables, record rest and release means slidably positioned in the mid-portion of said post comprising a pair of oppositely interleaved plates adapted for equal and opposite reciprocal movement parallel to a plane normal to said axis, each of said plates terminating at one end in a rest blade normally projecting from said post and terminating at its opposite end in a pair of spaced release blades normally retracted in said post, a cam surface on each of said plates, spring means connecting each of said plates for normally urging said rest blades in projected position and urging said release blades in retracted position, a spindle keyed for reciprocating movement in a coaxial bore through said turntables and said post, symmetrical cam means on said spindle for engagement with each said cam surface of said plates for moving said plates in opposite direction when said spindle is reciprocated in either direction for simultaneously retracting said rest blades and projecting said release blades whereby each of said records resting on said rest blades will be sequentially released by said release blades to a lowermost turntable by each reciprocal movement of said spindle in a predetermined direction corresponding to either of the said two vertical positions of said turntable assembly.

3. A center post for an invertible dual turntable assembly for sequentially playing both sides of a plurality of records in either of two vertical positions comprising a first and second turntable secured in parallel spaced coaxial relation with said post for slidably retaining a plurality of like disc records on said post between said turntables, a pair of rest blades slidably secured in the mid-portion of said post and normally projecting therefrom in a plane normal to the principal axis of said post, two pair of record release blades slidably secured in the mid-portion of said post, each pair of said release blades normally positioned for projecting movement from opposite sides of said post coplanar with and equi-spaced from said rest blades, a record trip shaft secured for reciprocation in said post coaxial therewith, cam means cooperatively related between said rest blades said release blades and said trip shaft whereby a single reciprocation of said trip shaft a predetermined distance in either direction will simultaneously retract said rest blades into said post and project said release blades from said post to release the lowermost record of said records to the lowermost of said turntables when said records are resting on said rest blades when said post is in either of its two vertical positions.

4. In a dual turntable assembly for sequentially playing both sides of a plurality of records adapted for concentric rotation about an axis invertible to each of two vertical positions comprising a first and second turntable means secured in fixed parallel spaced coaxial relation with a center post means for slideably retaining thereon a plurality of disc records between said turntable means, a record rest member normally projecting from the mid-portion of said post means adapted to support on either side thereof the lowermost one of said records gravitated thereto from either end portion of said post means, a pair of record release members normally retracted into said post means and adapted to be projected a predetermined distance therefrom in separate paths longitudinal and egui-spaced from opposite sides of said rest member for temporarily holding the second lowermost record of said records gravitated thereto from either end portion of said post when said release members are projected, tripping means journalled for predetermined movement in said post means articulated with said rest member and said release member for alternately and simultaneously projecting and retracting said rest member and said release members to release the lowermost record of said records for descent to a lowermost of said turntable means when said post means is in each of its two said vertical positions when operated.

5. In a record player, a turntable assembly comprising a pair of parallel spaced turntables coaxially secured to a center post for retaining and sequentially playing both sides of a plurality of disc records slideably retained on said post when the latter is in either of two vertical positions, a record holding and releasing means in the mid portion of said post consisting of two interposed members slideably positioned for opposite movement in said post transverse the axis thereof, each of said members having a record rest blade on one end and a pair of spaced release blades at the opposite end thereof, said members constructed and normally positioned in said post with each of said rest blades projecting from opposite sides of said post and each of said release blades straddling said holding blades in parallel equi spaced relation and in normal retracted position in said post, a cam surface on each of said members positioned opposite each other a predetermined distance from the axis of said post including yieldable means for urging said members in opposite direction and said cam surfaces toward each other, spindle means slideably positioned in a coaxial bore in said post including urging means yieldable in opposite directions for normally holding said spindle in a mid-position, cam means on said spindle positioned adjacent opposite sides of said cam surfaces on said members whereby said cam means will simultaneously engage both said cam surfaces, and reciprocate said members in opposite direction when said spindle means is reciprocated in either of two directions for simultaneously projecting said release blades and retracting said holding blades and vice versa to sequentially release the lowermost record from said records gravitated from either end portion of said post and deposit said records on a lowermost turntable for playing.

6. In a dual turntable assembly for sequentially playing both sides of a plurality of records adapted for concentric rotation about an axis invertible to each of two vertical positions comprising a first and second turntable means secured in fixed parallel spaced coaxial relation with a center post means for slideably retaining thereon a plurality of disc records between said turntable means, a record holding and release means in the mid-portion of said post means adapted to release downward for playing on a lowermost turntable each lowermost record of said records gravitated thereon from either end portion of said post means when operated, spindle means slideably keyed for coaxial reciprocating movement in said post means having a projection extending from each opposite end thereof including yieldable urging means for normally holding said spindle means in a mid-position, said spindle means operatively related to said record holding and release means for operating same when reciprocated in either direction by movement of either said projection thereof, drive means positioned to rotate about and reciprocate coaxial with a fixed axis adapted to sequentially engage, reciprocate and rotate either opposite said projections of said spindle means when the axis of said spindle and said drive means coincide for rotating said turntable assembly and reciprocating said spindle means for releasing said lowermost record to said lowermost turntable means when operated.

7. In a record player of the character described a detachable turntable for rotating a plurality of records on a center post coaxial therewith, said post having an annular groove around the outer periphery of one end portion thereof forming a detent shoulder, said turntable having an integral hub and a concentric bore therein slideably positioned on the said end portion of said post, said hub having an irregular groove about its outer periphery forming a predetermined number of apertures through said hub normally adjacent said groove in said post, coil spring means retained in said irregular groove and engaged with said detent shoulder for normally retaining said turntable on said post whereby said spring will yield over said detent shoulder and permit said turntable to slide from said post when predetermined coaxial force is applied between said post and said turntable.

References Cited in the file of this patent

UNITED STATES PATENTS

| | | |
|---|---|---|
| 2,043,789 | Ansley | June 9, 1936 |
| 2,166,716 | Chandler | July 18, 1939 |
| 2,604,325 | Hansen | July 22, 1952 |
| 2,683,039 | Fortune | July 6, 1954 |
| 2,685,447 | Ristau et al. | Aug. 3, 1954 |
| 2,762,627 | Johnson | Sept. 11, 1956 |

FOREIGN PATENTS

| | | |
|---|---|---|
| 395,137 | Great Britain | July 13, 1933 |
| 590,176 | Great Britain | July 10, 1947 |
| 647,416 | Great Britain | Dec. 13, 1950 |